(12) United States Patent
Kekud et al.

(10) Patent No.: US 12,625,259 B2
(45) Date of Patent: May 12, 2026

(54) METHOD FOR CHARACTERISING AN OBJECT IN AN ENVIRONMENT OF A MOTOR VEHICLE

(71) Applicant: Continental Autonomous Mobility Germany GmbH, Ingolstadt (DE)

(72) Inventors: Abhishek Kekud, Frankfurt am Main (DE); Robin Adams, Frankfurt am Main (DE); Sahar Khawatmi, Kelkheim (DE); Nicolai Glatz, Frankfurt am Main (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 148 days.

(21) Appl. No.: 18/247,386

(22) PCT Filed: Sep. 22, 2021

(86) PCT No.: PCT/DE2021/200125
§ 371 (c)(1),
(2) Date: Mar. 30, 2023

(87) PCT Pub. No.: WO2022/068999
PCT Pub. Date: Apr. 7, 2022

(65) Prior Publication Data
US 2024/0004066 A1     Jan. 4, 2024

(30) Foreign Application Priority Data

Sep. 30, 2020    (DE) ..................... 10 2020 212 381.0

(51) Int. Cl.
G01S 15/931 (2020.01)
B60W 30/06 (2006.01)
(Continued)

(52) U.S. Cl.
CPC .......... G01S 15/931 (2013.01); B60W 30/06 (2013.01); G01S 7/539 (2013.01); G08G 1/168 (2013.01);
(Continued)

(58) Field of Classification Search
None
See application file for complete search history.

(56) References Cited

U.S. PATENT DOCUMENTS

2008/0111733 A1     5/2008  Spyropulos
2009/0249878 A1*   10/2009  Faber .................. G01S 7/52006
340/932.2
(Continued)

FOREIGN PATENT DOCUMENTS

CN         106796292 A      5/2017
CN         111610531 A      9/2020
(Continued)

OTHER PUBLICATIONS

Notice of Reasons for Refusal drafted Jan. 9, 2024 for the counterpart Japanese Patent Application No. 2023-515801 and translation of same.
(Continued)

*Primary Examiner* — Todd Melton
*Assistant Examiner* — Jason R Roberson
(74) *Attorney, Agent, or Firm* — Buchanan Ingersoll & Rooney PC

(57)          ABSTRACT

The present disclosure relates to a method for characterizing an object in an environment of a motor vehicle by an assistance system of the motor vehicle, in which method the motor vehicle is moved relative to the object and ultrasonic signals are emitted with an ultrasonic sensor of the assistance system. Echoes of the ultrasonic signals reflected by the object are received, wherein, by a control device, respec-
(Continued)

tive amplitudes of the received echoes are ascertained, and a classification of a height of the object is determined based on the amplitudes. The classification of the height of the object is determined based on a determined first change in amplitude by comparing a first amplitude of a first echo with a second amplitude of a second echo received after the first echo. An assistance system is disclosed having an ultrasonic sensor and a control device designed to carry out such a method.

19 Claims, 2 Drawing Sheets

(51) Int. Cl.
*G01S 7/539* (2006.01)
*G08G 1/16* (2006.01)

(52) U.S. Cl.
CPC ..... *B60W 2420/54* (2013.01); *B60W 2554/20* (2020.02); *B60W 2554/60* (2020.02); *G01S 2015/932* (2013.01)

(56) References Cited

U.S. PATENT DOCUMENTS

| | | | |
|---|---|---|---|
| 2010/0220550 A1 | 9/2010 | Akiyama | |
| 2010/0302069 A1 | 12/2010 | Frank et al. | |
| 2011/0057813 A1* | 3/2011 | Toledo ................. | B60W 10/20 |
| | | | 340/425.5 |
| 2017/0299717 A1 | 10/2017 | Hallek | |
| 2020/0096633 A1* | 3/2020 | Matsuura ............... | G01S 7/539 |
| 2020/0242937 A1* | 7/2020 | Omiya .................. | G08G 1/168 |

FOREIGN PATENT DOCUMENTS

| | | | |
|---|---|---|---|
| DE | 102004047479 A1 | 4/2006 | |
| DE | 102005044050 A1 | 3/2007 | |
| DE | 102007042220 A1 | 3/2009 | |
| DE | 112014002206 T5 | 3/2016 | |
| DE | 102018200688 A1 | 7/2019 | |
| DE | 10 2018 103 414 A1 | 8/2019 | |
| DE | 102018102786 A1 | 8/2019 | |
| DE | 102018103560 A1 | 8/2019 | |
| DE | 102018218007 A1 | 4/2020 | |
| EP | 1764630 A1 | 3/2007 | |
| JP | 2005063196 A | 3/2005 | |
| JP | 2014085131 A | 5/2014 | |
| JP | 2014215283 A | 11/2014 | |
| JP | 2016080639 A | 5/2016 | |
| JP | 2017142171 A | 8/2017 | |
| JP | 2017538109 A | 12/2017 | |
| JP | 2020180806 A | 11/2020 | |
| KR | 20180040972 A | 4/2018 | |
| WO | 2018221255 A1 | 12/2018 | |
| WO | 2019058507 A1 | 3/2019 | |
| WO | 2019154745 A1 | 8/2019 | |

OTHER PUBLICATIONS

Notice of Reasons Refusal drafted on Dec. 6, 2024 for the cross-referenced Japanese Patent Application No. 2024-509375 and machine translation of same.
German Search Report dated Apr. 12, 2021 for the counterpart German Patent Application No. 10 2020 212 381.0.
The International Search Report and the Written Opinion of the International Searching Authority mailed on Jan. 5, 2022 for the counterpart PCT Application No. PCT/DE2021/200125.
Examiners Report dated Jun. 27, 2024 for the counterpart Indian Patent Application No. 202337023896 and translation of same.
Notice of Reasons for Refusal dated Jul. 19, 2024 for the counterpart Japanese Patent Application No. 2023-515801 and machine translation of same.
Office Action issued by the U.S. Patent and Trademark Office in the U.S. Appl. No. 18/691,646, mailed Aug. 27, 2025, U.S. Patent and Trademark Office, Alexandria, VA. (9 pages).
Office Action (The First Office Action) issued Apr. 22, 2025, by the State Intellectual Property Office of People's Republic of China in corresponding Chinese Patent Application No. 202180066070.5 and an English translation of the Office Action. (14 pages).
Office Action (Notice pursuant to Article 94(3) EPC) issued Jan. 5, 2026, by the European Patent Office in corresponding European Patent Application No. 22 761 403.9-1206 and an English machine translation of the Office Action. (20 pages).
Office Action issued by the U.S. Patent and Trademark Office in the U.S. Appl. No. 18/691,646, mailed Jan. 27, 2026, U.S. Patent and Trademark Office, Alexandria, VA. (9 pages).
Office Action (Notice of Second Examination Opinion) issued Jan. 19, 2026, by the State Intellectual Property Office of People's Republic of China in corresponding Chinese Patent Application No. 202180066070.5 and an English machine translation of the Office Action. (11 pages).
Office Action (Hearing Notice) issued Feb. 26, 2026, by the Patent Office, Government of India, in corresponding India Patent Application No. 202337023896 with an English Translation of the Office Action. (2 pages).

* cited by examiner

100

101

102

103

104

METHOD FOR CHARACTERISING AN OBJECT IN AN ENVIRONMENT OF A MOTOR VEHICLE

CROSS-REFERENCE TO RELATED APPLICATIONS

The present application is a National Stage Application under 35 U.S.C. § 371 of International Patent Application No. PCT/DE2021/200125 filed on Sep. 22, 2021, and claims priority from German Patent Application No. 10 2020 212 381.0 filed on Sep. 30, 2020, in the German Patent and Trademark Office, the disclosures of which are herein incorporated by reference in their entireties.

TECHNICAL FIELD

The present disclosure relates to a method for characterizing an object in an environment of a motor vehicle by means of an assistance system of the motor vehicle, in which method the motor vehicle is moved relative to the object and ultrasonic signals are emitted with an ultrasonic sensor of the assistance system. Echoes of the ultrasonic signals reflected by the object are received and, by means of a control device, respective amplitudes of the received echoes are ascertained, wherein a classification of a height of the object is ascertained based on the amplitudes. The present disclosure further relates to an assistance system having an ultrasonic sensor and a control device which is designed to carry out such a method.

BACKGROUND

Ultrasonic sensors usually include a transmitting device which emits ultrasonic signals which propagate in air at the speed of sound, namely approximately 340 meters per second. To this end, a membrane of the ultrasonic sensor is commonly excited to mechanical vibrations with a corresponding transducer element. The ultrasonic signal is reflected as an echo by objects in the environment and is detected by a receiver device of the ultrasonic sensor. The spacing or, in other words, the distance from the object can be ascertained on the basis of the difference in transit time between the time of transmission and the time of reception, taking account of the propagation speed of the ultrasonic signal. In this case, the amplitude of the reflected ultrasonic signal or of the echo can also be determined.

Ultrasonic sensors are usually deployed in motor vehicles to capture the surroundings in a range of up to approximately 7 meters. In particular, ultrasonic sensors are particularly important during semi-automatic or automatic driving maneuvers, especially in connection with parking applications, for instance for measuring parking distances, looking for parking spaces or when parking. The motor vehicle is usually moved relative to the objects, wherein a measuring cycle is carried out in each case when the vehicle is moved at previously ascertained points in time. During each measuring cycle, an ultrasonic signal is emitted with an ultrasonic sensor. Methods and corresponding assistance systems are already known from the prior art, which provide the driver with different information regarding the environment of the motor vehicle with the aid of ultrasonic sensors and which support him during maneuvering of the motor vehicle and, in particular, during the locating of a parking space and when parking the motor vehicle in the parking space. Assistance systems exist, for example, which are equipped with parking space localization and which notify the driver whether a parking space is available in the immediate environment of the motor vehicle or whether an available parking space is large enough in order to be able to park the motor vehicle therein. Such assistance systems need information about objects located in the environment of the motor vehicle, which can be formed, for example, by parked vehicles, curbs, and walls, for secure localization and dimensioning of a parking space.

In addition to the distance of the motor vehicle from an object, the height of the object is also usually of significance. The height is an important factor in being able to decide whether an object or obstacle can be driven over or not. In particular, when the motor vehicle is maneuvered at least semi-autonomously on the basis of the measurements of an ultrasonic sensor, it is desirable to ascertain the height of the captured object.

The height is ascertained with one-dimensional (1D) ultrasonic sensors, that is to say ultrasonic sensors for ascertaining the distance, which are regularly used in the motor vehicle sector; this process is in principle very difficult due to physical limitations. The height of an object cannot be measured directly with the aid of such an ultrasonic sensor. In order to ascertain the height, a camera is therefore additionally used, for example, and the height is estimated based on a 2D image, or a method based on multiple sensors is used for estimating the height on the basis of triangulation. However, methods based on a camera or multiple sensors do not exploit the advantages of a 1D ultrasonic sensor in terms of costs and robustness.

A method and an assistance system of the type previously indicated are known, for example, from DE 10 2004 047 479 A1. In order to classify a height of an object, when a motor vehicle drives past the object located to the side of the motor vehicle, ultrasonic signals are emitted by means of an ultrasonic sensor of the motor vehicle and the echoes of the ultrasonic signals reflected by the objects are received. Based on an amplitude of a received echo, the classification of the height of the object is ascertained.

SUMMARY

The present disclosure is based on the object of indicating an alternative method for characterizing an object in an environment of a motor vehicle as well as a corresponding assistance system which makes possible a classification of the height of the object, which is as inexpensive as possible and reliable.

The aforementioned object is addressed by the teaching of claim 1 as well as the alternative, independent claim 14. Expedient embodiments and further developments of the present disclosure are set out in the sub-claims and the following description.

In the case of the method according to the present disclosure for characterizing an object in an environment of a motor vehicle by means of an assistance system of the motor vehicle, the motor vehicle is moved relative to the object and ultrasonic signals are emitted with an ultrasonic sensor, in particular a 1D ultrasonic sensor, of the assistance system. Echoes of the ultrasonic signals reflected by the object are received, wherein, by means of a control device, respective amplitudes of the received echoes are ascertained, and wherein a classification of a height of the object is determined based on the amplitudes.

According to the present disclosure, the classification of the height of the object is determined on the basis of a determined first change in amplitude by comparing a first amplitude of a first echo with a second amplitude of a second echo which was received after the first echo.

The present disclosure initially proceeds from the consideration that an inexpensive classification of the height of an object is made possible when recourse is had to a sensor of the motor vehicle which is installed anyway, and that a particularly inexpensive and robust classification is further promoted by the fact that no further sensor, or more precisely no further type of sensor, in particular no camera, and no associated fusion of the corresponding sensor data, which is computationally complex and prone to failure, are used. The present disclosure further proceeds from the consideration that the radiation pattern of an ultrasonic sensor is, in principle, a function of the elevation angle, that is to say the power of an ultrasonic signal, which is emitted by an ultrasonic sensor to an object in the capturing region, depends on the elevation angle. In the case of an object which is located at a height, that is to say in particular has a height which is less than the installation height of the ultrasonic sensor in the motor vehicle, in particular below a certain distance between the object and the motor vehicle, more precisely the ultrasonic sensor, the elevation angle and, therefore, the power, or, in other words, the amplitude of the reflected ultrasonic signal consequently change as a function of the distance between the motor vehicle or the ultrasonic sensor and the object. This fact can be utilized to determine the classification of the height of an object.

Therefore, the present disclosure provides for the classification of the height of the object based solely on the sensor data of an ultrasonic sensor moving relative to the object, in particular a 1D ultrasonic sensor, on the basis of a determined first change in amplitude which is determined by comparing a first amplitude of a first echo with a second amplitude of a second echo which was received after the first echo.

The advantage of the configuration according to the present disclosure is that it provides a method by means of which an inexpensive and reliable classification of the height of the object is made possible.

The objects to be characterized can be objects which extend from the ground, for example a road surface or other terrain, and extend substantially orthogonally to the ground. However, they can also be objects which do not extend from the ground such as, for example, a crossbar of a fence, or which do not extend orthogonally to the ground such as, for example, a ramp.

The ultrasonic sensor, in particular a 1D ultrasonic sensor, can, for example, be arranged in or behind a bumper of the motor vehicle. Alternatively, the ultrasonic sensor, in particular a 1D ultrasonic sensor, can be arranged in or behind a body component, for example a door of the motor vehicle.

It is equally possible for only a single ultrasonic sensor, in particular a 1D ultrasonic sensor, to be used. However, alternatively, multiple ultrasonic sensors, in particular multiple 1D ultrasonic sensors, can be used as well.

In an advantageous embodiment, the first echo and the second echo are temporally successive echoes.

In particular, the two classes "high" and "low" are used as a classification of the height of the object. The object is classified as "high", provided that the object is located at least at the installation height of the ultrasonic sensor, that is to say provided that the object in particular has a height which corresponds at least to the installation height of the ultrasonic sensor. The object is classified as "low" when the object is located below the installation height of the ultrasonic sensor, that is to say when the object in particular has a height which is less than the installation height of the ultrasonic sensor.

In a further advantageous embodiment, the object is located in the vicinity of the motor vehicle, preferably at a distance of up to two meters from the ultrasonic sensor of the motor vehicle, wherein when the motor vehicle approaches the object, the object is classified as low if an amplitude decrease over the course of time is determined as the first change in amplitude, and wherein the object is classified as high if an amplitude increase over the course of time is determined as the first change in amplitude. The classification as low is in particular determined for an object which is located below the installation height of the ultrasonic sensor, that is to say which in particular has a height which is less than the installation height of the ultrasonic sensor. Such an object is, for example, a curb. The classification as high is, in particular, determined for an object which is located at least at the installation height of the ultrasonic sensor, that is to say which in particular has a height which corresponds at least to the installation height of the ultrasonic sensor. Such an object is, for example, a wall, a fence or a vehicle.

This is based on the fact that in the case of an object, which is located at least at the installation height of the ultrasonic sensor, the elevation angle does not change while the motor vehicle or the ultrasonic sensor is moving toward the object. Thus, the power or, in other words, the amplitude of the reflected ultrasonic signal or echo merely depends on the distance between the object and the ultrasonic sensor. The amplitude of the reflected ultrasonic signal increases when the motor vehicle, more precisely the ultrasonic sensor, approaches such an object, that is to say when the distance between the object and the ultrasonic sensor reduces. On the other hand, in the case of an object which is located below the installation height of the ultrasonic sensor, the elevation angle changes below a certain distance between the object and the ultrasonic sensor and continues to decrease while the motor vehicle or the ultrasonic sensor is moving toward the object. The amplitude of the reflected ultrasonic signal reduces when the motor vehicle or the ultrasonic sensor approaches such an object. It is true that the amplitude itself increases, the more the distance between the object and the ultrasonic sensor reduces. However, in contrast, the dominant factor here is that the elevation angle reduces as the distance decreases, as a result of which the amplitude of the reflected ultrasonic signal consequently decreases overall.

In a further advantageous embodiment, the classification of the height of the object is determined on the basis of a comparison of the first change in amplitude with a second change in amplitude, wherein the second change in amplitude is determined by comparing a third amplitude of a third echo which was received after the second echo with the second amplitude of the second echo or with a fourth amplitude of a fourth echo which was received after the second echo and before the third echo. That is to say that, in this case, two changes in amplitude are compared with one another, as a result of which the robustness of the classification of the height of the object is further promoted.

In a further advantageous embodiment, when the motor vehicle approaches the object, the object is classified as low if an amplitude increase over the course of time is determined as the first change in amplitude and an amplitude decrease over the course of time is determined as the second change in amplitude.

This is based on the fact that in the case of an object such as, for example, a curb which is located below the installation height of the ultrasonic sensor, that is to say which in particular has a height which is less than the installation height of the ultrasonic sensor if, in particular, this object is not yet located in the vicinity of the motor vehicle, preferably at a distance of greater than two meters from the ultrasonic sensor of the motor vehicle, the elevation angle is at least approximately 90°. Consequently, the power or, in other words, the amplitude of the reflected ultrasonic signal substantially merely depends on the distance between the object and the ultrasonic sensor. The amplitude of the reflected ultrasonic signal or echo initially increases when the motor vehicle or the ultrasonic sensor approaches such an object, that is to say when the distance between the object and the ultrasonic sensor reduces. That is to say that the first change in amplitude results in an amplitude increase here over the course of time. When the motor vehicle or the ultrasonic sensor continues to approach the object and the object is then in particular located in the vicinity of the motor vehicle, preferably at a distance of below two meters from the ultrasonic sensor of the motor vehicle, the elevation angle changes as the motor vehicle or ultrasonic sensor continues to approach the object, wherein this becomes less than 90° and gradually continues to diminish as the motor vehicle or ultrasonic sensor continues to approach the object or the distance diminishes. This leads to the amplitude of the reflected ultrasonic signal also gradually decreasing as the motor vehicle or sensor continues to approach the object. It is true that the amplitude itself increases, the more the distance between the object and the ultrasonic sensor reduces. However, in contrast, the dominant factor here is that the elevation angle reduces as the distance decreases, as a result of which the amplitude of the reflected ultrasonic signal consequently decreases overall. That is to say that the second change in amplitude results in an amplitude decrease here over the course of time. That is to say that, if, based on the comparison of the first change in amplitude with the second change in amplitude, it is found that an amplitude increase over the course of time was determined as the first change in amplitude and an amplitude decrease over the course of time was determined as the second change in amplitude, the object is classified as low.

In a further advantageous embodiment, the object is located in the vicinity of the motor vehicle, preferably at a distance of up to two meters from the ultrasonic sensor of the motor vehicle, wherein when the motor vehicle approaches the object, the object is classified as low if an amplitude decrease over the course of time is determined in each case as the first change in amplitude and as the second change in amplitude, and if the second change in amplitude is additionally greater than the first change in amplitude. That is to say that a measure of the amplitude decrease is taken account of here.

This is based on the fact that in the case of an object such as, for example, a curb which is located below the installation height of the ultrasonic sensor, that is to say which in particular has a height which is less than the installation height of the ultrasonic sensor when this object is located in the vicinity of the motor vehicle, preferably at a distance of less than two meters from the ultrasonic sensor of the motor vehicle, the elevation angle gradually decreases while the motor vehicle or the ultrasonic sensor continues to move toward the object. This leads to the amplitude of the reflected ultrasonic signal or echo also gradually decreasing as the motor vehicle or sensor approaches the object. It is true that the amplitude itself increases, the more the distance between the object and the ultrasonic sensor reduces. However, in contrast, the dominant factor here is that the elevation angle reduces as the distance decreases, as a result of which the amplitude of the reflected ultrasonic signal consequently decreases overall. That is to say that the second change in amplitude results in an amplitude decrease over the course of time, here, which is greater than the amplitude decrease of the first change in amplitude, as a result of which the object is classified as low.

In a further advantageous embodiment, the object is located in the vicinity of the motor vehicle, preferably at a distance of up to two meters from the ultrasonic sensor of the motor vehicle, wherein when the motor vehicle approaches the object, the object is classified as high if an amplitude increase over the course of time is in each case determined as the first change in amplitude and as the second change in amplitude, and if the second change in amplitude is additionally greater than the first change in amplitude. That is to say that a measure of amplitude increase is taken account of here.

This is based on the fact that in the case of an object such as, for example, a wall, a fence or a vehicle which is located at least at the installation height of the ultrasonic sensor, that is to say which in particular has a height which corresponds at least to the installation height of the ultrasonic sensor, even if this object is located in the vicinity of the motor vehicle, preferably at a distance of less than two meters from the ultrasonic sensor of the motor vehicle, the elevation angle does not change while the motor vehicle or the ultrasonic sensor moves toward the object. The power, more precisely the amplitude of the reflected ultrasonic signal, thus merely depends on the distance between the object and the ultrasonic sensor. The amplitude of the reflected ultrasonic signal or echo increases when the motor vehicle or the ultrasonic sensor approaches such an object, that is to say when the distance between the object and the ultrasonic sensor reduces. That is to say that the second change in amplitude produces an amplitude increase over the course of time, here, which is greater than the amplitude increase of the first change in amplitude, as a result of which the object is classified as high.

In a further advantageous embodiment, the classification of the height of the object is determined when the first change in amplitude, in terms of the amount, additionally lies above a predefined threshold. In this way, the reliability of the determination of the classification of the height of the object is further increased. In an embodiment, in which the second change in amplitude is additionally or alternatively taken account of, the classification of the height of the object is preferably determined when the second change in amplitude, in terms of the amount, additionally or alternatively lies above a predefined threshold.

In a further advantageous embodiment, the threshold is previously ascertained as a function of a current speed of the motor vehicle and/or a temperature in the environment of the motor vehicle and/or a humidity in the environment of the motor vehicle and/or an installation height of the ultrasonic sensor on the motor vehicle. Since the temperature has noticeable effects on the airborne sound insulation in the environment of the motor vehicle, the temperature can be captured with the aid of a corresponding sensor and the threshold can be adjusted thereto. The same applies to the humidity. This leads to an even more reliable classification of the height of the object.

In a further advantageous embodiment, the comparison of the amplitudes is based on a difference and/or a relationship of the amplitudes.

In a further advantageous embodiment, the comparison of the changes in amplitude is based on a difference and/or a relationship of the changes in amplitude.

In a further advantageous embodiment, the method is utilized during an assisted and/or semi-automatic and/or automatic parking method.

In a further advantageous embodiment, the classification of the height of the object is exclusively based on sensor data of the ultrasonic sensor. That is to say that, in particular, no further type of sensor such as, for example, a camera or a radar sensor is enlisted for determining the classification of the height.

The present disclosure further includes an assistance system having an ultrasonic sensor and a control device. The control device is designed to carry out the method according to the present disclosure.

The advantages described for the method according to the present disclosure and the embodiments also apply accordingly to the assistance system according to the present disclosure.

BRIEF DESCRIPTION OF THE DRAWINGS

Exemplary embodiments of the present disclosure are explained in greater detail below with reference to a drawing, wherein.

DETAILED DESCRIPTION

Figure 1:
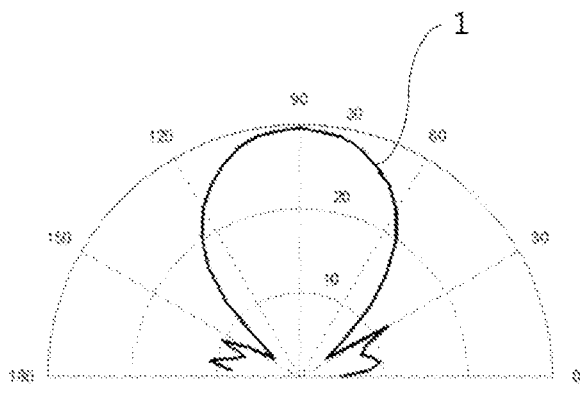
FIG. 1 shows a radiation diagram which depicts a radiation pattern of an ultrasonic sensor as a function of the elevation angle.

Parts corresponding to one another are always provided with the same reference numerals in all of the figures.

A radiation diagram is shown in FIG. 1, which depicts a radiation pattern 1 of an ultrasonic sensor as a function of the elevation angle. It is obvious from this that the radiation pattern 1 of the ultrasonic sensor is a function of the elevation angle, that is to say that the power of an ultrasonic signal, which is emitted by an ultrasonic sensor to an object in the capturing range, depends on the elevation angle.

If an object is located at an elevation angle of 90°, i.e., at least at an installation height of the ultrasonic sensor in a motor vehicle, then the elevation angle does not change when the motor vehicle, more precisely the ultrasonic sensor, approaches the object. The power or, in other words, the amplitude of the reflected ultrasonic signal or echo only depends on the distance between the ultrasonic sensor and the object. Therefore, the amplitude of the reflected ultrasonic signal gradually increases when the motor vehicle or the ultrasonic sensor approaches a tall object.

In the case of an object which has a height which is less than the installation height of the ultrasonic sensor in the motor vehicle, the elevation angle and, therefore, the power or amplitude of the reflected ultrasonic signal consequently change as a function of the distance between the motor vehicle or the ultrasonic sensor and the object. When the motor vehicle or ultrasonic sensor approaches the object, the elevation angle gradually reduces until it reaches approximately 0° as soon as the ultrasonic sensor is located directly on the object.

Figure 2:
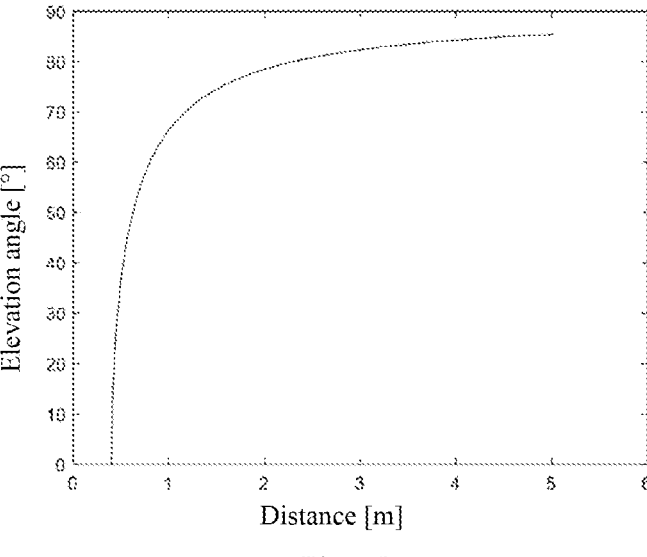
FIG. 2 shows a diagram which depicts the elevation angle as a function of the distance of the ultrasonic sensor according to FIG. 1 from an object, and FIG. 3 show a flow chart of a method for characterizing an object in an environment of a motor vehicle.

FIG. 2 shows a diagram which depicts the elevation angle as a function of the distance of the ultrasonic sensor according to FIG. 1 from an object. The object has a height which is 40 cm less than the installation height of the ultrasonic sensor in the motor vehicle. The object is configured here as a curb.

It is obvious from the diagram that when the object is not yet located in the vicinity of the motor vehicle, in particular at a distance of greater than two meters from the ultrasonic sensor of the motor vehicle, the elevation angle is approximately 90°. In this range, the power, more precisely the amplitude of the reflected ultrasonic signal, consequently substantially depends merely on the distance between the object and the ultrasonic sensor. The amplitude of the reflected ultrasonic signal increases when the motor vehicle or the ultrasonic sensor approaches such an object, that is to say when the distance between the object and the ultrasonic sensor reduces.

If the motor vehicle or the ultrasonic sensor continues to approach the object and the object is then located in the vicinity of the motor vehicle, in particular at a distance of less than two meters from the ultrasonic sensor of the motor vehicle, the elevation angle gradually reduces noticeably as the motor vehicle or ultrasonic sensor continues to approach the object. This leads to the amplitude of the reflected ultrasonic signal also gradually decreasing when the motor vehicle or ultrasonic sensor continues to approach the object. It is true that the amplitude itself increases, the more the distance between the object and the ultrasonic sensor reduces. However, in contrast, the dominant factor here is that the elevation angle reduces as the distance decreases, as a result of which the amplitude of the reflected ultrasonic signal consequently decreases overall.

Figure 3:
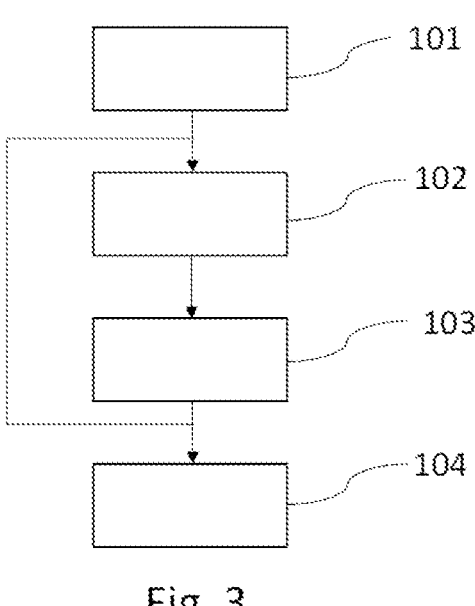

FIG. 3 shows a flow chart of a method 100 for characterizing an object in an environment of a motor vehicle. The motor vehicle includes an assistance system having a control device and a 1D ultrasonic sensor which is arranged on a front bumper of the motor vehicle, and which has a radiation pattern according to FIG. 1. The front of the motor vehicle approaches the object from a distance of approximately 2.5 meters and the ultrasonic sensor continually emits ultrasonic signals. The object is a curb which has a height which is approximately 40 cm less than the installation height of the ultrasonic sensor in the motor vehicle.

In a step 101, a first echo is received and a first amplitude of the first echo is ascertained.

In a subsequent step 102, a second echo which follows the first echo in time is received, and a second amplitude of the second echo is ascertained.

In a step 103, a first change in amplitude is determined on the basis of a comparison of the first amplitude with the second amplitude. In the present case, an amplitude increase is determined. Since the object is not yet located in the vicinity of the motor vehicle at the time of the measurement, that is to say is still at a distance of greater than two meters from the ultrasonic sensor of the motor vehicle, the elevation angle is approximately 90°. Here, the power, more precisely the amplitude of the reflected ultrasonic signal, is consequently substantially dependent merely on the distance between the object and the ultrasonic sensor. That is to say that the amplitude of the reflected ultrasonic signal increases when the motor vehicle or the ultrasonic sensor approaches such an object, that is to say when the distance between the object and the ultrasonic sensor reduces. That is to say that the first change in amplitude here produces an amplitude increase over the course of time.

Since the object was not yet located in the vicinity of the motor vehicle at the time of the measurement, no final classification of the height of the object takes place yet based on the determined change in amplitude and the method 100 returns to step 102. A further, third echo which follows the second echo in time is thus received, and a third amplitude of the third echo is ascertained.

Subsequently, in step 103, a second change in amplitude is determined on the basis of a comparison of the second amplitude with the third amplitude. Since the motor vehicle continued moving in the direction of the object in the meantime and, at the time of the further measurement, the object is then located in the vicinity of the motor vehicle and, specifically, at a distance of 0.5 meters from the motor vehicle or ultrasonic sensor, an amplitude decrease is determined as the second change in amplitude. This is based on the fact that the elevation angle in this region is then substantially less than 90°, which leads to the amplitude of the reflected ultrasonic signal decreasing overall, as a result of which the third amplitude of the third echo is smaller than the second amplitude of the second echo. That is to say that the second change in amplitude produces an amplitude decrease over the course of time here.

In a step 104, a classification of the height of the object is determined. To this end, a comparison of the first change in amplitude with the second change in amplitude takes place. Since, in the present case, an amplitude increase over the course of time is determined as the first change in amplitude and an amplitude decrease over the course of time is determined as the second change in amplitude, the object is classified as low.

Based on this method 100, the height of the object, in the present case the height of the curb, can be classified in an inexpensive and reliable manner.

The invention claimed is:

1. A method for characterizing an object in an environment of a motor vehicle by an assistance system of the motor vehicle, the method comprising: performing, by the assistance system, at least one of an assisted, semi-automatic, or automatic parking method, which includes:

emitting continually ultrasonic signals with an ultrasonic sensor of the assistance signal of the motor vehicle while the motor vehicle moves relative to the object;

receiving echoes of the ultrasonic signals reflected by the object;

ascertaining, by a control device of the motor vehicle, respective amplitudes of the received echoes; and classifying a height of the object based on the ascertained amplitudes, wherein the classification of the height of the object is determined on the basis of a determined first change in amplitude by comparing a first amplitude of a first echo of a first ultrasonic signal with a second amplitude of a second echo of a second ultrasonic signal, wherein the second echo was received after the first echo, wherein the classification of the height of the object is determined when the first change in amplitude is above a predefined threshold, which is determined as a function of at least a current speed of the motor vehicle, wherein the classification of the height of the object is determined on the basis of a comparison of the first change in amplitude with a second change in amplitude, and the second change in amplitude is determined by comparing a third amplitude of a third echo of a third reflected ultrasonic signal which was received after the second echo with the second amplitude of the second echo or with a fourth amplitude of a fourth echo of a fourth reflected ultrasonic signal, wherein the fourth echo was received after the second echo and before the third echo; and localizing and dimensioning a parking space using at least the classified height of the object for parking the motor vehicle during at least one of the assisted, semi-automatic, or automatic parking method.

2. The method according to claim 1, wherein the first echo and the second echo are temporally successive echoes.

3. The method according to claim 1, wherein the object is located in the vicinity of the motor vehicle, when the motor vehicle approaches the object, the object is classified as low if an amplitude decrease over a course of time is determined as the first change in amplitude, and the object is classified as high if an amplitude increase over the course of time is determined as the first change in amplitude.

4. The method according to claim 3, wherein the object is located in the vicinity of the motor vehicle at a distance of up to two meters from the ultrasonic sensor of the motor vehicle.

5. The method according to claim 1, wherein when the motor vehicle approaches the object, the object is classified as low if an amplitude increase over the course of time is determined as the first change in amplitude and an amplitude decrease over the course of time is determined as the second change in amplitude.

6. The method according to claim 1, wherein the object is located in the vicinity of the motor vehicle, when the motor vehicle approaches the object, the object is classified as low if an amplitude decrease over the course of time is determined in each case as the first change in amplitude and as the second change in amplitude, and if the second change in amplitude is additionally greater than the first change in amplitude.

7. The method according to claim 6, wherein the object is located in the vicinity of the motor vehicle at a distance of up to two meters from the ultrasonic sensor of the motor vehicle.

8. The method according to claim 1, wherein the object is located in the vicinity of the motor vehicle, when the motor vehicle approaches the object, the object is classified as high if an amplitude increase over the course of time is in each case determined as the first change in amplitude and as the second change in amplitude, and if the second change in amplitude is additionally greater than the first change in amplitude.

9. The method according to claim 1, wherein the predetermined threshold is further determined as a function of at least one of a temperature in the environment of the motor vehicle, a humidity in the environment of the motor vehicle, or an installation height of the ultrasonic sensor on the motor vehicle.

10. The method according to claim 1, wherein the comparison of the amplitudes is based on at least one of a difference or a relationship of the amplitudes.

11. The method according to claim 1, wherein the comparison of the changes in amplitude is based on at least one of a difference or a relationship of the changes in amplitude.

12. The method according to claim 1, wherein the classification of the height of the object is exclusively based on sensor data of the ultrasonic sensor.

13. The method according to claim 1, comprising:

receiving at least one of temperature and humidity measurements from one or more additional sensors; and adjusting the predefined threshold based on the at least one temperature and humidity measurement.

14. The method according to claim 1, comprising:
sending a notification to a driver of the motor vehicle based on the heigh classification of the object.

15. The method according to claim 1, wherein the object is located below a sightline of the driver of the motor vehicle.

16. An assistance system, comprising:
an ultrasonic sensor configured to continually emit ultrasonic signals when a motor vehicle is moved relative to an object, and receive echoes of the ultrasonic signals reflected by the object; and
a control device configured to ascertain respective amplitudes of the received echoes and classify a height of the object based on the ascertained amplitudes, wherein to classify the height of the object the control device is configured to determine a first change in amplitude by comparing a first amplitude of a first echo of a first ultrasonic signal with a second amplitude of a second echo of a second ultrasonic signal, the second echo being received after the first echo, wherein the classification of the height of the object is determined when the first change in amplitude is above a predefined threshold, which is determined as a function of at least a current speed of the motor vehicle,
wherein the classification of the height of the object is determined on the basis of a comparison of the first change in amplitude with a second change in amplitude, and the second change in amplitude is determined by comparing a third amplitude of a third echo of a third reflected ultrasonic signal which was received after the second echo with the second amplitude of the second echo or with a fourth amplitude of a fourth echo of a fourth reflected ultrasonic signal, wherein the fourth echo was received after the second echo and before the third echo,
wherein the control device is further configured to localize and dimension a parking space using at least the classified height of the object for parking the motor vehicle during at least one of an assisted, semi-automatic, or automatic parking method.

17. An assistance system for a vehicle, comprising:
an ultrasonic sensor configured to continually emit ultrasonic signals while the vehicle moves relative to an object;

a controller configured to receive echoes from at least one ultrasonic sensor that are reflected by the object in an environment of the vehicle, ascertain amplitudes of amplitudes of the received echoes, determine a classification of a height of the object based upon the ascertained amplitudes, wherein the classification of the height of the object is determined based on a determined first change in amplitude by comparing a first amplitude of a first echo of the received echoes of a first ultrasonic signal with a second amplitude of a second echo of the received echoes of a second ultrasonic signal, the echoes of the second ultrasonic signal being was received after the echoes of the first ultrasonic signal, wherein the classification of the height of the object is determined when the first change in amplitude is above a predefined threshold, which is determined as a function of at least a current speed of the motor vehicle,
wherein the classification of the height of the object is determined on the basis of a comparison of the first change in amplitude with a second change in amplitude, and the second change in amplitude is determined by comparing a third amplitude of a third echo of a third reflected ultrasonic signal which was received after the second echo with the second amplitude of the second echo or with a fourth amplitude of a fourth echo of a fourth reflected ultrasonic signal, wherein the fourth echo was received after the second echo and before the third echo,
wherein the controller is further configured to localize and dimension a parking space using at least the classified height of the object for parking the motor vehicle during at least one of an assisted, semi-automatic, or automatic parking method.

18. The assistance system of claim 17, wherein the first echo and the second echo are temporally successive echoes.

19. The assistance system of claim 17, wherein the object is located in the vicinity of the motor vehicle, and when the motor vehicle approaches the object, the object is classified as low if an amplitude decrease over a course of time is determined as the first change in amplitude, and the object is classified as high if an amplitude increase over the course of time is determined as the first change in amplitude.

* * * * *